UNITED STATES PATENT OFFICE.

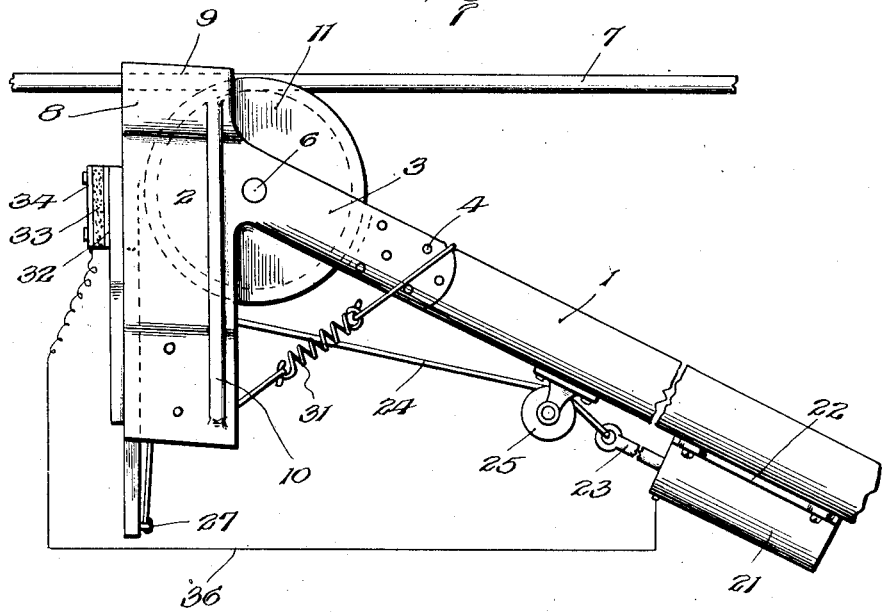

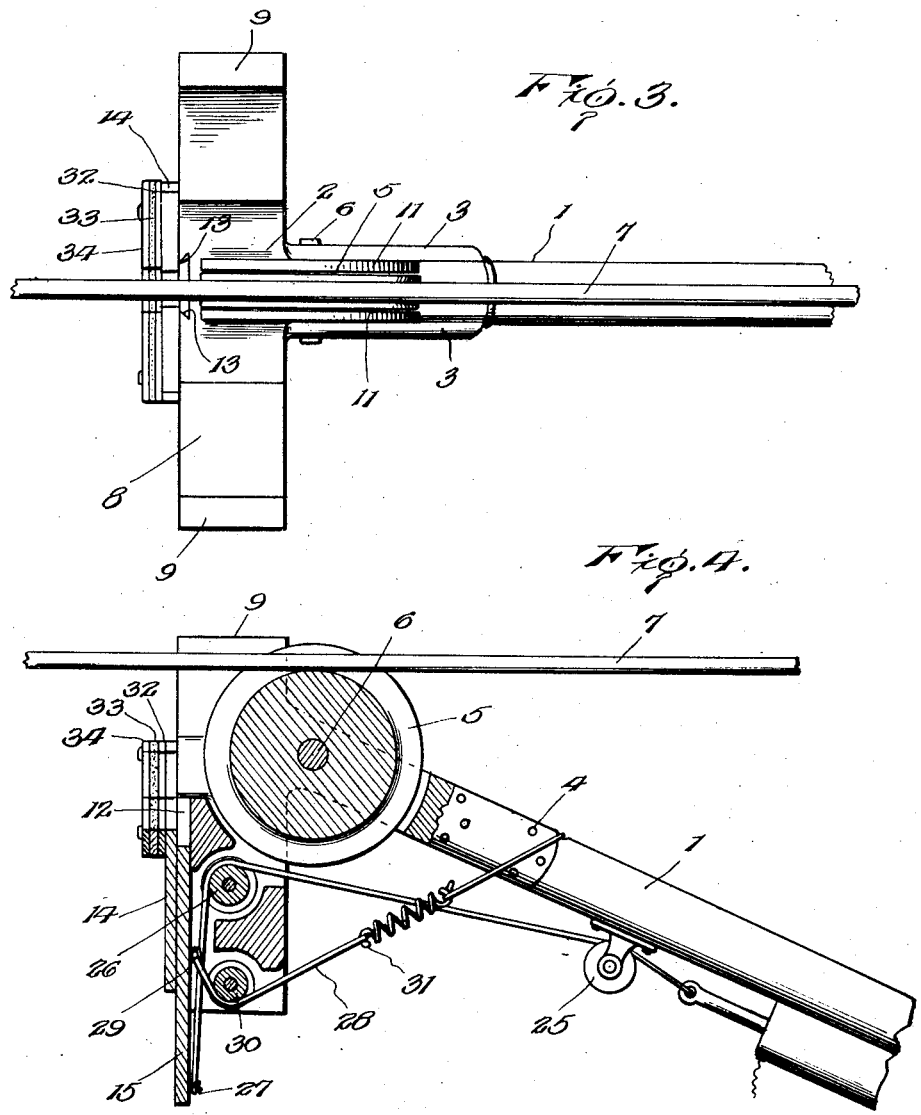

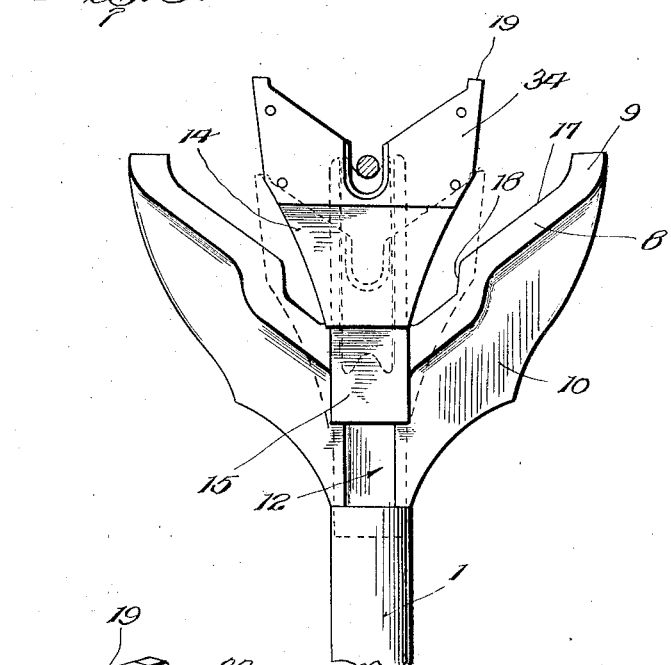
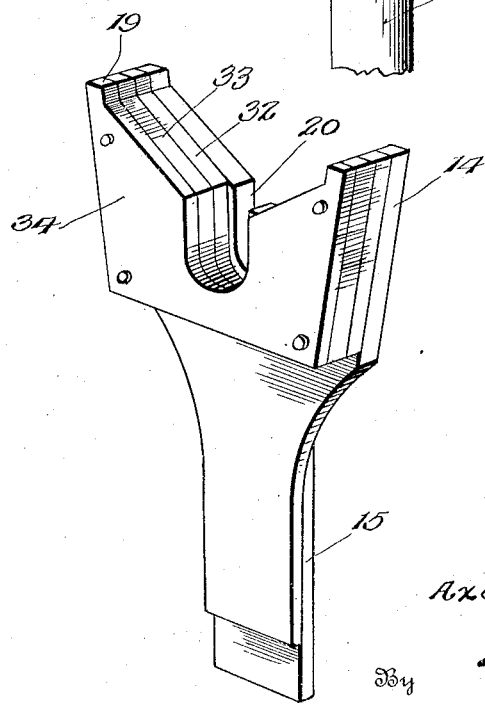

AXEL ALFRED JOHNSON, OF HOQUIAM, WASHINGTON.

TROLLEY-POLE.

1,356,369.   Specification of Letters Patent.   Patented Oct. 19, 1920.

Application filed May 24, 1920. Serial No. 383,928.

*To all whom it may concern:*

Be it known that I, AXEL A. JOHNSON, a citizen of the United States, and residing at Hoquiam, in the county of Grays Harbor and State of Washington, have invented certain new and useful Improvements in Trolley-Poles, of which the following is a specification.

This invention relates to devices for automatically replacing the trolley wire on the trolley wheel.

An object of the invention is to provide a device which will engage the trolley wire after it leaves the wheel, closing a circuit through an electro-magnet that will operate a movable member on the device and replace the wire in the groove of the trolley wheel.

Another object is to provide a compact and simple structure which may be readily riveted to the end of a trolley pole.

The invention also comprehends improvements in construction and operation which are particularly pointed out in the following description and claims.

In the drawings:

Figure 1 is a side elevation of the device in position on a trolley pole with the trolley wheel engaging with the wire.

Fig. 2 is a rear end elevation of the device, the parts being positioned as in Fig. 1.

Fig. 3 is a plan view of the device.

Fig. 4 is another view similar to Fig. 2 showing the movable slide in operative position to replace the wire on the trolley wheel, an intermediate position being shown in dotted lines.

Fig. 5 is a sectional view on line 5—5 of Fig. 2.

Fig. 6 is a perspective view of the slide.

1 indicates a trolley pole having the bifurcated extension 3 on the main body portion 2 thereof, secured to the pole by rivets 4. The trolley wheel 5 is mounted on a shaft 6 carried by the extension 3 near its junction with the body portion 2 and is shown in Fig. 1 in engagement with the trolley wire 7.

The body portion 2 is formed with upwardly inclined projections 8, from either side thereof, the ends of which are curved upwardly as shown at 9 and reinforced by webs 10. The body portion is formed in the central portion with guard flanges 11, which extend to the periphery of the trolley wheel 5.

The rear edge of the body is recessed at 12 so as to form inwardly projecting beveled portions 13. A slide 14 is formed with a tongue 15 having beveled portions 16 adapted to coact with the portions 13 and slidably mount said slide on the rear end of body portion 2.

The upper inclined portions 17 of the projections 8 are stepped as indicated at 18, and the slide is slightly wider than the stepped portion 18. The upper edge of the slide is inclined to correspond with the incline of the projections 8, the outer ends having projections 19 formed on the slide beyond the stepped portion 18. As shown in Fig. 2 the inclined portion of the slide is slightly below the outer inclined portion of the projections 8 when the slide is in lowered position. The inclined portions of the slide terminate at the center in a vertically disposed recess 20, large enough to receive the trolley wire.

A solenoid 21 is mounted on the pole 1 and insulated therefrom by a strip 22, the armature 23 of which is formed with an eye to which is fastened a cable 24. The cable passes over a pulley 25 mounted on the trolley pole and another pulley 26 mounted in the body 2, the end thereof extending downwardly and secured to the lower end of tongue 15 as shown at 27. When energized the solenoid is adapted to move the armature and pull the cable to raise the slide to its uppermost position as will be obvious.

To the central portion of the tongue 15 is secured one end of another cable 28 as indicated at 29, which passes over a pulley 30 carried in the lower end portion of body 2, and the other end is secured to a coil spring 31 which is fastened to the trolley pole as shown. The spring 31 is adapted to return and hold the slide in its lowered position as shown in Fig. 1.

A brass plate 32, a piece of insulation 33 and another brass plate 34 are mounted one on the other respectively and secured to the slide 14 so that the upper edges thereof will conform to the shape of the upper edge of said slide, the central recessed portion being larger than the recessed portion of the slide as indicated at 35. These brass plates act as contact members and are adapted to engage with the trolley wire to close a circuit.

The circuit is formed through the trolley wire which is one side of a source of energy, engaging with strip 34 which is connected to one terminal of the solenoid by a wire 36, the other terminal of the solenoid being connected with the other side of the source of energy.

When this invention is attached to a trolley pole and the wheel is engaged with the trolley wire, the parts assume the position shown in Fig. 1. If now the wheel is caused to jump off and leave the trolley wire, the pole will move upwardly carrying the wheel above the wire in a well known manner; but the wire will engage one of the projections 8 as shown at 37 and in the further upward movement of the pole will slide down the inclined portion onto the inclined edge of slide 14 as shown at 38. The circuit above described will be made and the armature will pull on the cable 24, which will elevate the slide to the position shown in Fig. 4. The trolley wire will be held in the position shown in dotted lines in Fig. 4 until the slide elevates the wire above the guard flanges 11, when the wire will slide into the recess 20, the circuit now being broken, the wire will fall into the groove in the trolley wheel and the spring 31 will return the slide to its original position.

What I claim is:

1. A device for automatically replacing a trolley wheel on a trolley wire comprising a body portion adapted to be secured to a trolley pole, and formed with wire engaging projections, a slide mounted on the body adapted to coöperate with said projections, circuit closing means mounted on the slide, and means for operating the slide in one direction operated by said circuit closing means.

2. A device for automatically replacing a trolley wheel on a trolley wire including a body, adapted to be secured to a trolley pole, a trolley wheel carried by the body, said body being formed with inclined wire engaging projections, a slide mounted for vertical movement on the body and having inclined upper edges and formed with a recess in the edge thereof, means for moving the slide and means carried by the slide to cause the first-mentioned means to be actuated.

3. A device for automatically replacing a trolley wheel on a trolley wire comprising a trolley pole, a body having a bifurcated extension secured to the pole, oppositely inclined stepped wire engaging projections formed on the body, a trolley wheel mounted in the body, a slide slidably mounted on the body having inclined upper edge portions adapted to coact with the outer stepped portions of the projections and a recess formed in the center portion thereof, an electro-magnet mounted on the pole having an armature, a cable having one end secured to the armature, pulleys mounted on the pole and in the body member for supporting the cable, the other end of said cable being secured to the slide, a coil spring having one end secured to said trolley pole and a cable secured to the other end of said string and to the slide, a contact carried by the slide, and electrical connection between the slide and the electro-magnet whereby when the trolley wire closes the circuit with the electro-magnet the slide will be operated to replace the wire on the wheel.

In testimony whereof I affix my signature.

AXEL ALFRED JOHNSON.